US006239718B1

(12) United States Patent
Hoyt et al.

(10) Patent No.: US 6,239,718 B1
(45) **Date of Patent: *May 29, 2001**

(54) LEARNING-BY-EXAMPLE PROGRAMMABLE REMOTE CONTROL SYSTEM

(75) Inventors: Joshua K. Hoyt, Portland; Kevin J. Frank, Hillsboro, both of OR (US)

(73) Assignee: Kabushiki Kaisha Kenwood, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/606,340

(22) Filed: Feb. 23, 1996

(51) Int. Cl.[7] .................... G05B 19/02

(52) U.S. Cl. .................... 340/825.22; 340/825.24; 340/825.69; 341/176

(58) Field of Search .................... 340/825.22, 825.25, 340/825.24, 825.69, 825.72; 341/23, 176; 348/734, 4; 359/143, 145, 147, 148, 142; 455/352, 353, 355, 151.1, 151.2, 151.4; 345/158, 169, 173

(56) References Cited

U.S. PATENT DOCUMENTS 4,623,887 * 11/1986 Welles, II .................... 340/825.57
4,703,359 * 10/1987 Rumbolt et al. .................... 348/734
4,825,200 * 4/1989 Evans et al. .................... 341/23
5,294,981 * 3/1994 Yazolino et al. .................... 348/4
5,410,326 * 4/1995 Goldstein .................... 348/734
5,473,317 * 12/1995 Inomata et al. .................... 340/825.25

OTHER PUBLICATIONS

"Multi–Brand Controller MAC/15/20 Operating Guide", © 1992, Gemini Industries, Inc., 215 Entin Road, Clifton, New Jersey 07014.

* cited by examiner

*Primary Examiner*—Edwin C. Holloway, III
(74) *Attorney, Agent, or Firm*—Eric J. Robinson; Nixon Peabody LLP

(57) ABSTRACT

A system and method for programming a controller to learn a sequence of commands necessary to operate and control the functionality of one or more remote A/V system components. The system includes a remote control unit for transmitting command signals to a controller for processing. The controller includes a microprocessor chip able to learn by examples entered by a user during set-up. This information is used to interpret the command signals to construct the complete command string for operating the selected remote A/V component. Subsequently, the controller sends the command string information to an infrared repeater where it is directed to the selected A/V component. In essence, the user is provided with a consistent interface that is independent of the variability in codes and button sequences. During operation, the user simply enters a basic, predetermined command sequence in order to yield a desired function in the selected remote A/V component (such as changing the television channel).

20 Claims, 5 Drawing Sheets

LEARNING-BY-EXAMPLE PROGRAMMABLE REMOTE CONTROL SYSTEM

TECHNICAL FIELD OF THE INVENTION

The present invention relates to a programmable remote control system for operating audio and/or video (A/V) components and more particularly, to a system and method for enabling a controller to "learn" the correct sequence of commands corresponding to the specific functions of one or more remote A/V components.

BACKGROUND OF THE INVENTION

Modern day consumers have benefitted tremendously from the advancements made in the home electronics industry. With the creation of the remote control unit for controlling a variety of audio and video components, consumers can now operate their entire system without leaving the comfort of their favorite chair or sofa. The industry has recognized the importance of the remote control unit and continues to find ways to further enhance its versatility.

Due to its popularity, nearly all audio and/or visual components are sold with an infrared (IR) remote control. The pairing of the remote control unit with a particular component requires only that each product have a command protocol which consists of a family of codes that are self-consistent between the remote and the device. In other words, many electronic components are designed to operate with a particular remote control unit which is programmed with a matching command protocols. The drawback of this type of remote system is that the remote control unit may only be used with the specific electronic component for which the remote control was designed to operate. This trend results in consumer dissatisfaction because in today's market, many consumers buy components built by different manufacturers. Thus, a user may need two or more remote control units to effectively operate their A/V system.

Over the past decade, each manufacturer has developed its own remote control codes to provide some consistency between the components that it manufactures. No attempt at integration of the electronic components at a systems level, however, has taken place between the respective manufacturers. Ideally, this sort of integration would result in the use of universal codes which, in essence, would allow one manufacturer's remote control unit to operate another manufacturer's A/V system.

Rather than a universal architecture with consistent codes for each function, the existing solution to the plethora of different manufacturers IR codes is to attack the symptom by implementing either a learning remote control or a remote control having a database of codes for several manufacturer formats. The learning remote control uses an IR window to create a one-to-one correspondence between a specific button/function on the remote control unit and a specific code in the remote A/V device. The problem with the existing learning remote control units, however, is the burden placed on the user to correctly program each function. This task undoubtedly affects consumer satisfaction with the product because of the somewhat complex programming required for each remote control unit.

The alternative to the learning remote control unit noted above uses a four digit code to create the same one-to-one correspondence by employing a pre-programmed database of manufacturer codes. Kenwood Corporation of Japan has recently developed the KC-Z1 Stage Three Home Theater video controller which employs a pre-programmed database of manufacture codes. This system utilizes a graphical user interface (GUI) remote control unit designed to enhance customer satisfaction by controlling a variety of A/V components using icons provided on the GUI remote control unit.

While both of the aforementioned solutions create the correct bit-stream corresponding to a given button, neither solution addresses the issue of requiring minimal user input to achieve more complex functionality in a remote A/V device. Most remote device functions require more than one button push to control the functionality of a remote device (e.g., programming channel selection, etc.). Consequently, the burden remains on the user to press the correct sequence of commands, which like codes, can vary from product to product.

The existing infrared remote control units having universal functionality include a database of command protocols for a finite number of manufacturers. Manufacturers such as Sony, Mitsubishi and JVC each have a unique set of command protocols for controlling individual components and systems they manufacture. The command protocol sets are subsets of a main database stored in the remote control units. A four-digit code, also unique to each manufacturer, is used to identify which subset of manufacturer command protocols needs to be accessed in order to perform the desired function. For example, if a user enters a series of commands on the remote control unit to change the track on a Pioneer Laserdisc player, a signal corresponding to a single four digit manufacturer code, unique to Pioneer, identifies the subset of Pioneer command protocols and transmits a command signal using the Pioneer command protocols to subsequently change the track on the Pioneer Laserdisc player. Currently, a user must enter a string of commands or command sequence in order to change the track on a laserdisc, the channel on a television set or to locate a track on a CD player. This process can be burdensome in that the user has to locate each button to push on the remote control unit to effectively operate a remote A/V device. Moreover, the user is required to remember the different sequence of buttons to push for controlling the functionality of each remote A/V device. If the buttons are not pushed within a pre-determined period of time, the remote control "times out" requiring the user to reenter the string of commands. In addition, if a user depresses an incorrect button while entering a command sequence, the user must reenter the entire string of commands.

One remote control unit currently available on the market automatically transmits a MUTE command before and after a channel change command entered by a user. This remote control unit is Multi-Brand Controller Model No. MAC15/20 manufactured by Gemini Industries, Inc. The transmission of the MUTE command is preprogrammed into the remote control unit, and this feature is not programmable by the user. Furthermore, the MUTE command is only appended to the entered command when selecting CABLE channels using the remote control in order to silence the loud sound made by some cable converters when switching channels.

The inventors have recognized the aforementioned problems and have realized the need for a system and method that will simplify the remote control process with regard to ease of use and functionality. Moreover, a remote control system that is able to operate any A/V component on the market today regardless of the command sequences used by the individual manufacturers would be a welcome improvement over the current technology. This feature would add to the existing universal remote architecture to create a true user friendly device that would benefit consumers.

SUMMARY OF THE INVENTION

In view of the foregoing, it is an object of the present invention to provide an improved remote control system and method which operates and controls a variety of A/V components from different home electronic manufacturers.

It is another object of the present invention to provide a remote control system which "learns" the correct sequence of commands required to control the functionality of a remote A/V component.

It is a further object of the present invention to provide a remote control system that interprets a sequence of commands specific to a particular brand of A/V component by separating the commands into parts in order to learn the format of a particular manufacturer.

It is yet another object of the present invention to provide a remote control system which separates a command sequence into a prefix, body and suffix wherein the prefix and suffix commands are appended to a body command subsequently entered by a user to create a command string for operating a remote A/V device.

It is yet a further object of the present invention to provide a remote control system having a consistent user interface and radio frequency protocol interface.

It is also an object of the present invention to provide a remote control system which can support several distinct command sequences for different brands of A/V components simultaneously.

These and other objects are achieved by a system and method which enable a user to "teach" a controller the correct sequence of commands necessary to operate and control the functionality of a remote A/V system component. The system includes a remote control unit for transmitting command signals to a controller for processing. The controller includes a microprocessor chip for interpreting the command signals and for providing any additional commands necessary to complete the command sequence needed to operate the end remote A/V component. Subsequently, the controller sends the command sequence information to an infrared repeater where it is directed to the selected A/V component. In essence, the user is provided with a consistent interface that is independent of the variability in codes and button sequences.

The method of the present invention allows the controller to "learn" the correct sequence of commands corresponding to specific functions of a remote A/V device. This function is performed during the set-up procedure for the remote control unit. First, a user is directed to input at least two examples of command sequences into a remote control unit. The two examples teach the controller how numbers are entered for each manufacturer format. For example, to control television tuning a user would enter a 0,5 and "Enter" command string as the first example for tuning to channel 5, which tells the system how to select a station between channels 1 and 9. For the second example the user may enter a 0, 1, 5 and "Enter" command string to tune to channel 15, thus, teaching the system how to select a station greater than channel 9. These commands are transmitted to the controller for processing. The controller interprets the two sets of commands by separating the command sequences into a prefix, a body and a suffix. For example, if the user enters a 0, 1, 5 and presses the "Enter" button, the controller divides the command sequence into a prefix "0", a body "1, 5" and a suffix "Enter." The prefix and suffix are stored in the controller for later retrieval.

After set-up procedures are complete, the user may now operate the remote control unit with the appropriate remote A/V device. During operation, the user is only required to enter the body of the command sequence as noted above in order to yield a desired function in the selected remote A/V component (such as changing the television channel to 15). The goal is to have a consistent user interface for operating the different brands of remote A/V components using a single remote control unit. The controller receives the transmitted signal and automatically appends the prefix and suffix commands to the entered body command to create a command string capable of operating the selected remote A/V component. The command string is then translated using either a pre-programmed database of manufacturer codes or "learned" manufacturer codes and transmitted to the selected remote A/V component via an infrared repeater. The controller can support several distinct command sequences simultaneously in order to operate a variety of different brands of components using a single remote control unit.

DETAILED DESCRIPTION OF PREFERRED EMBODIMENTS

The present invention is directed to a remote control system and method for enabling a controller to "learn" the correct sequence of commands corresponding to the specific functions of a remote A/V component system that require multiple button presses. The present invention is described using the format of A/V components manufactured by Kenwood Corporation of Japan. The structure and functionality of other brands of components may differ from the components discussed herein, nonetheless, the reader should keep in mind that the present invention is designed to operate with a wide range of A/V components.

Figure 1:
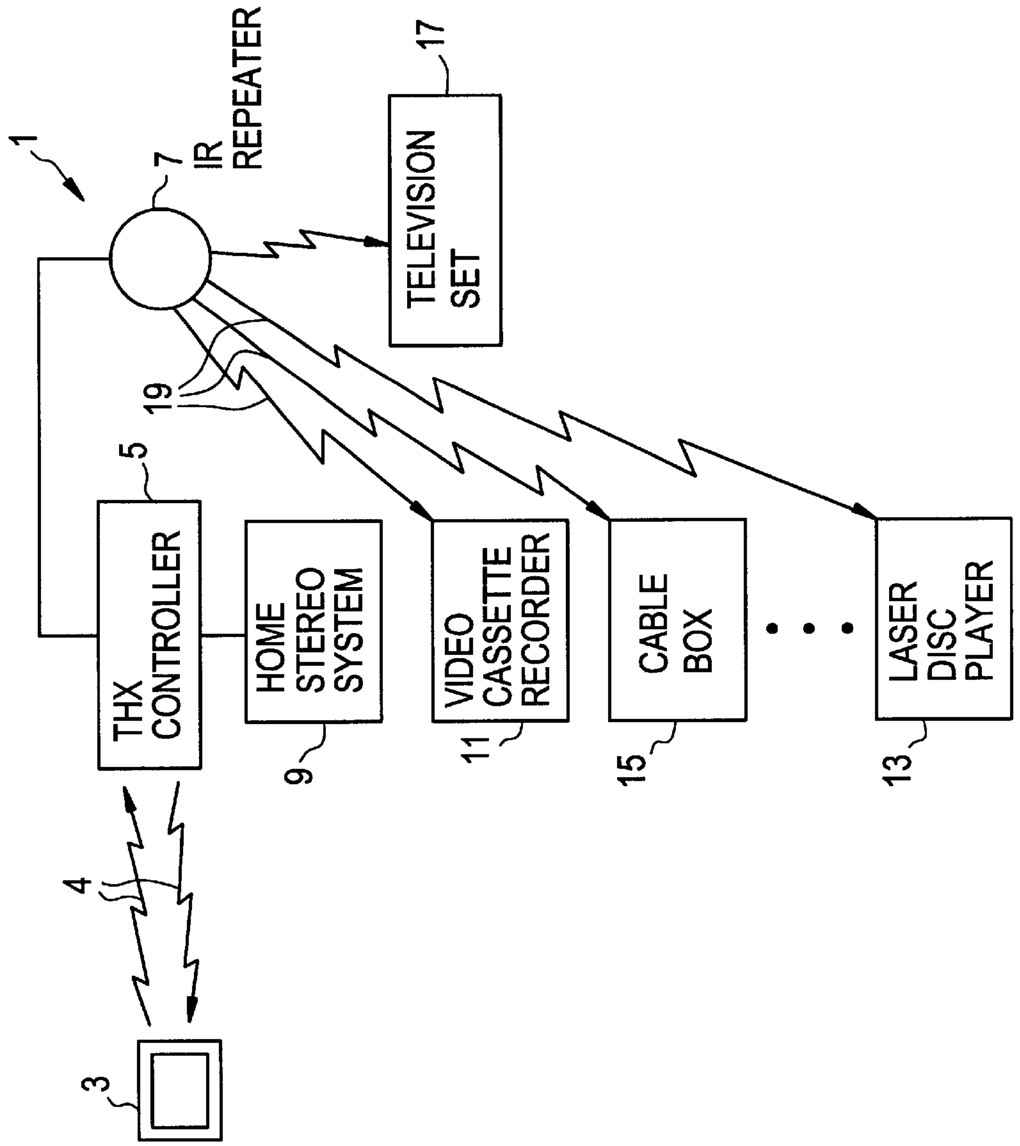
FIG. 1 is an illustration of the system configuration in which the preferred embodiment of the present invention operates.

FIG. 1 of the drawings illustrates a system configuration 1 in which the preferred embodiment of the present invention operates. The basic elements of control system 1 include a user input device, a controller, an infrared transmitting device and one or more remote A/V components.

The user input device may be a remote control unit 3 having a GUI, numerical keypad and/or other style of user interface. In the preferred embodiment, the GUI remote control unit included with the controller is employed, however, a variety of remote control units from different manufactures may operate with the present invention. Remote control unit 3 uses icons, menus and prompts displayed on an LCD touch pad to allow a user to input various functions which the user wishes to be implemented. For example, if a user desires to switch to a different channel on a television set, the user can enter the desired channel using the numerals on the touch screen of the GUI remote control unit. Thus, remote control unit 3 allows the user to input a sequence of commands in order to control the operation of a remote A/V device such as a television. Remote control unit 3 issues a command signal which ultimately changes the channel on the television set or performs a different commanded function depending on the user input. If a remote control unit having a numerical keypad is employed, the user would enter numerals, alphanumeric characters, and/or function commands provided on the keypad to control the functionality of a remote device.

Remote control unit 3 is able to control remote A/V devices by transmitting and receiving radio frequency signals 4, as illustrated in FIG. 1. The sequence of commands entered by a user are transmitted from remote control unit 3 to a controller as radio signals. In the preferred embodiment, remote control unit 3 transmits a half-duplex radio frequency signal at 900 MHz on any of ten radio channels. Moreover, there is two-way communication between the touch pad and controller to enable the touch pad to display all adjustments made to any system component.

An infrared remote control unit may also be used with the present invention to control a remote A/V device. In this case, the command information is transmitted on an infrared frequency to a controller where it is processed and sent to the dedicated remote A/V device. Infrared remote control units are better suited for one-way communication and thus, are less desirable than the remote control unit of the preferred embodiment.

A controller 5 receives the command signals transmitted by remote control unit 3 and interprets the signals to determine the desired functionality. In the preferred embodiment, a THX™ controller which is designed to operate with a variety of home theater components is used to implement the method of the present invention, such as the KC-Z1 Controller manufactured by Kenwood Corporation. THX™ technology has been developed by Lucasfilm Entertainment Corporation and is used in movie theater and home theater systems to improve the sound produced by the A/V system. This technology has been incorporated into a variety of THX™ controllers manufactured by companies specializing in home electronics such as Panasonic, McIntosh, Yamaha, Denon, Onkyo and Sony.

In an alternative embodiment, however, the circuitry used to implement the method of the present invention can also be housed in remote control unit 3 or in a remote A/V device.

Controller 5 is connected to one or more infrared (IR) repeaters 7 either through a cable or wirelessly. IR repeater 7 receives a coded signal from controller 5 and transmits a simplex infrared signal to a remote A/V device to control its functionality based on the sequence of commands entered by a user. The signal generated by the controller is derived from a database or learned codes which correspond to the command protocol of the remote A/V components manufacturer. Any brand of IR repeater that is capable of transmitting infrared signals to a variety of remote devices in an A/V system may be used.

The remote A/V components used in the preferred embodiment may include a home stereo system 9 that is hardwired to controller 5. Components used in a typical home stereo system include compact disc (CD) players, analog and digital tape players, phonorecord players, and other similar audio devices. One skilled in the art should appreciate, however, that the components in home stereo system 9 do not have to be hardwired to controller 5. Controller 5 may communicate with these components via an IR repeater or other similar device.

Additional remote A/V components which communicate with controller 5 via IR repeater 7 may include a video cassette recorder (VCR) 11, laser disc player 13, cable box 15, or television 17. These remote A/V devices, however, must be designed to work with IR remote control units. For example, if a user chooses to change the tuning channel on the cable box, she enters the desired tuning channel number on the keypad or graphical interface of remote control unit 3, such as a "4" and "7" to tune to channel "47," and the sequence of commands are transmitted to cable box 15 via controller 5 which instructs the cable box to switch to tuning channel "47."

Figure 2:
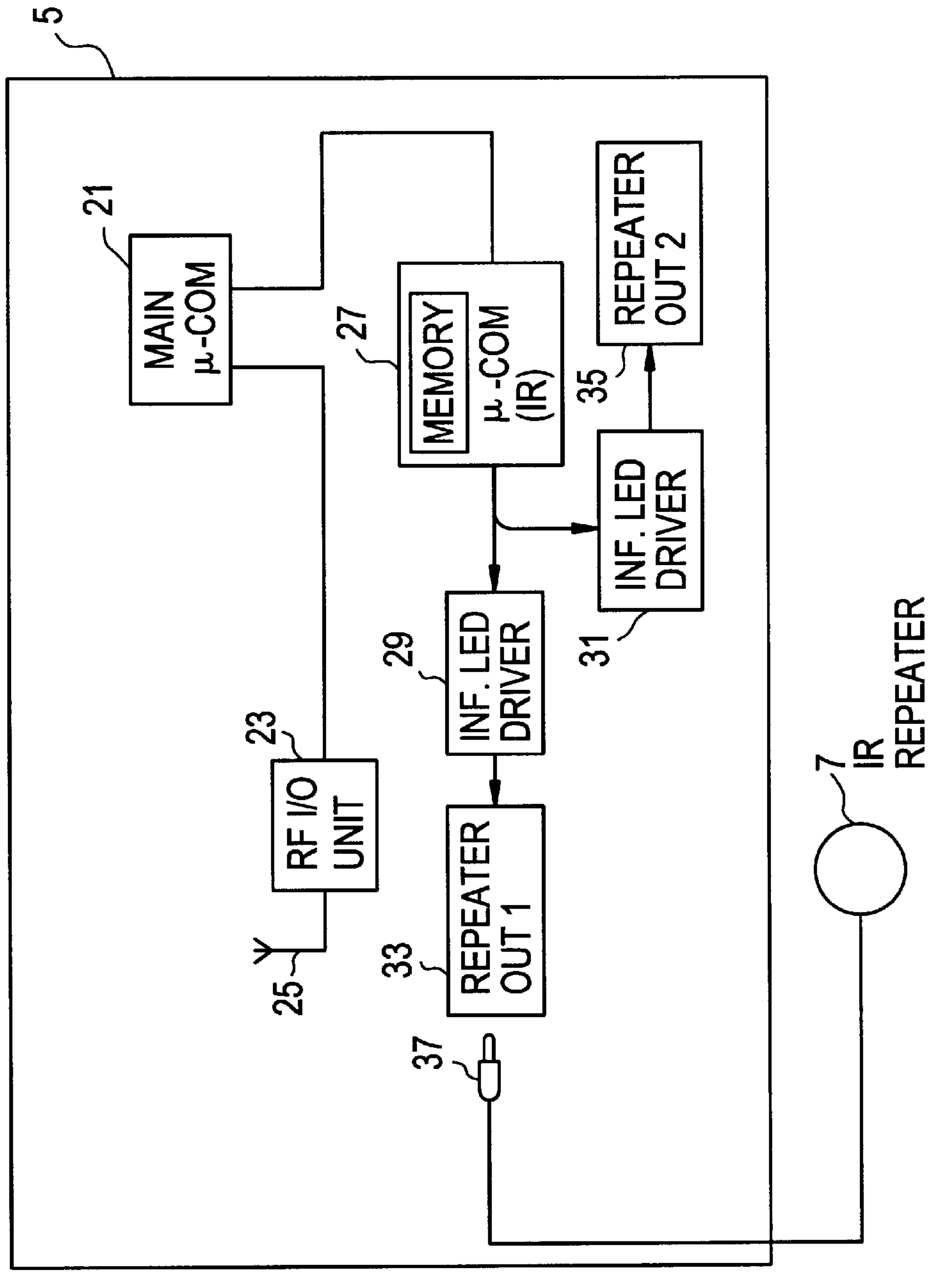
FIG. 2 is a schematic illustration of the system hardware of the present invention.

The present invention is implemented by the system hardware of the KC-Z1 Stage Three Home Theater video controller. The portion of this electronic architecture that is relevant to the present invention is illustrated in FIG. 2 and explained in detail below.

Controller 5 may have one or more main processors which control the operation of an entire A/V system. A main processor 21 controls the operation of controller 5 and more importantly, the firmware that implements the present invention. The processor has many inputs and outputs other than those illustrated in FIG. 2. For simplicity, however, only the hardware in which the present invention resides is shown connected to main processor 21.

Main processor 21 interprets the commands received from remote control unit 3 and constructs a command string which is subsequently transmitted to a remote A/V device to control its operation. Moreover, main processor 21 includes a memory device for storing commands entered by a user for later retrieval. The processing steps performed in main processor 21 to implement the present invention are discussed in detail below with reference to FIGS. 4 and 5.

Main processor 21 is connected to a radio frequency, input/output (RF I/O) unit 23 which controls the signals to and from remote control unit 3. Extending from RF I/O unit 23 is an antenna 25 which receives and transmits the RF signals to remote control unit 3.

In addition to RF I/O unit 23, main processor 21 is connected to a programmable remote control code processor 27 dedicated to translating the commands received by main processor 21 by matching manufacturer codes stored in a pre-programmed database with each command so that the remote A/V device recognizes the command sequence. Programmable remote control code processor 27 may be used in lieu of main processor 21 to implement the present invention as discussed below.

Remote control code processor 27 may include a database of codes used to operate different brands of remote A/V components. Remote control processor 27 houses a memory device for storing this database of codes and is preferably a chip made by United Electronics, Inc. (UEI) which uses a four digit code to create a one-to-one correspondence between a remote control unit and a remote A/V device using a pre-programmed database of manufacturer codes.

Figure 3A:
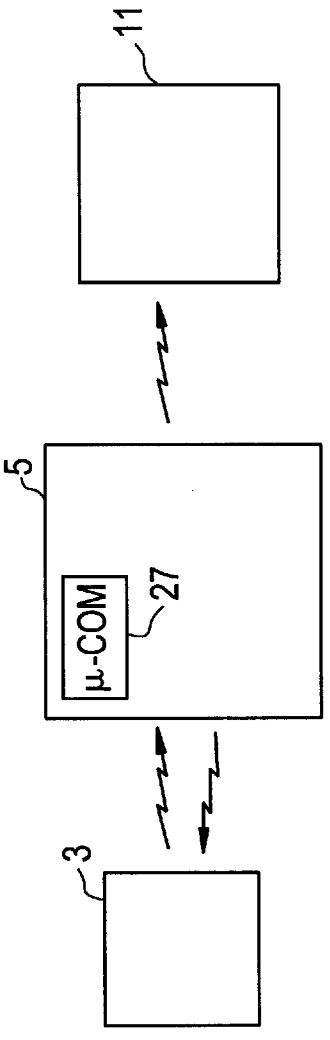
FIG. 3*a* is an illustration of the system configuration with the remote control code processor housed in the controller in accordance with the preferred embodiment of the present invention.
Figure 3B:
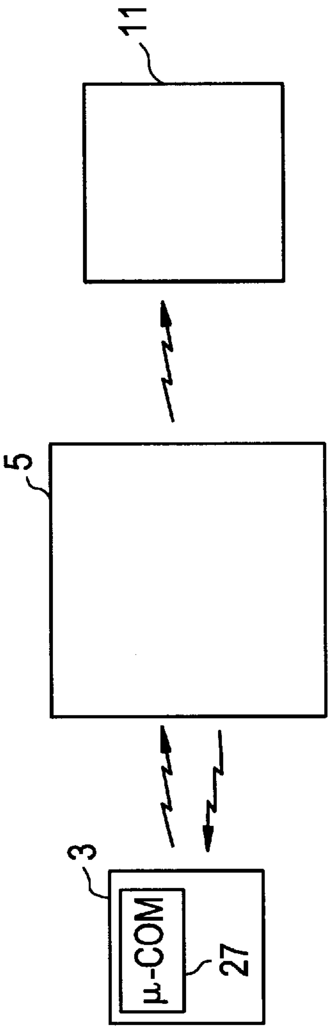
FIG. 3*b* is an illustration of the system configuration with the remote control code processor housed in the remote control unit in accordance with an alternative embodiment of the present invention.
Figure 3C:
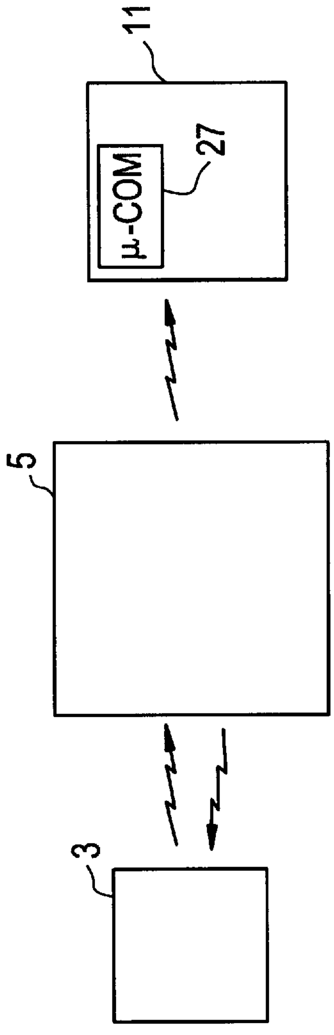
FIG. 3*c* is an illustration of the system configuration with the remote control code processor housed in the remote A/V device in accordance with an alternative embodiment of the present invention.

FIGS. 3*a*, 3*b* and 3*c* illustrate the system configuration of the preferred embodiment and alternative embodiments wherein the remote control code processor 27 is housed in different components of control system 1. The functionality of the system configurations in FIGS. 3*a*, 3*b*, and 3*c* is different, in that, the command string is translated in different components of the system. Specifically, FIG. 3*a* illustrates remote control code processor 27 housed in controller 5 which is the preferred embodiment of the present invention. In alternative embodiments, illustrated in FIGS. 3*b* and 3*c*, the remote control code processor 27 may be housed in remote control unit 3 or in a remote device, such as VCR 11, respectively. In FIG. 3*b*, the command string is translated before being transmitted to controller 5 and VCR 11. In FIG. 3*c*, the command string entered by the user is not translated until it has reached the remote device. Although the present invention may be implemented in accordance with FIGS. 3*b* and 3*c*, incorporating remote control code processor 27 in controller 5 is preferred because controllers are currently designed to operate with various remote control devices and A/V components and thus, are more easily adaptable to implement the present invention.

Remote control code processor 27 connects with one or more infrared light-emitting diode (LED) drivers 29 and 31 which transform the command signals received from remote control code processor 27 into an infrared signal that is ultimately transmitted to the respective remote A/V components (i.e., CD player, tape player, etc.).

Repeater output jacks 33 and 35 are linked to infrared LED drivers 29 and 31, respectively, for connecting one or more external IR repeaters. As illustrated in FIG. 2, plug 37 connects IR repeater 7 to repeater output jack 33. IR repeater 7 receives the appropriate command string signal from microprocessor chip 27 via output jack 33 and transmits the signal to the selected remote A/V device. Other IR repeaters may be connected to controller 5 by the adding an infrared LED driver and repeater output jack for each additional repeater.

Figure 4:
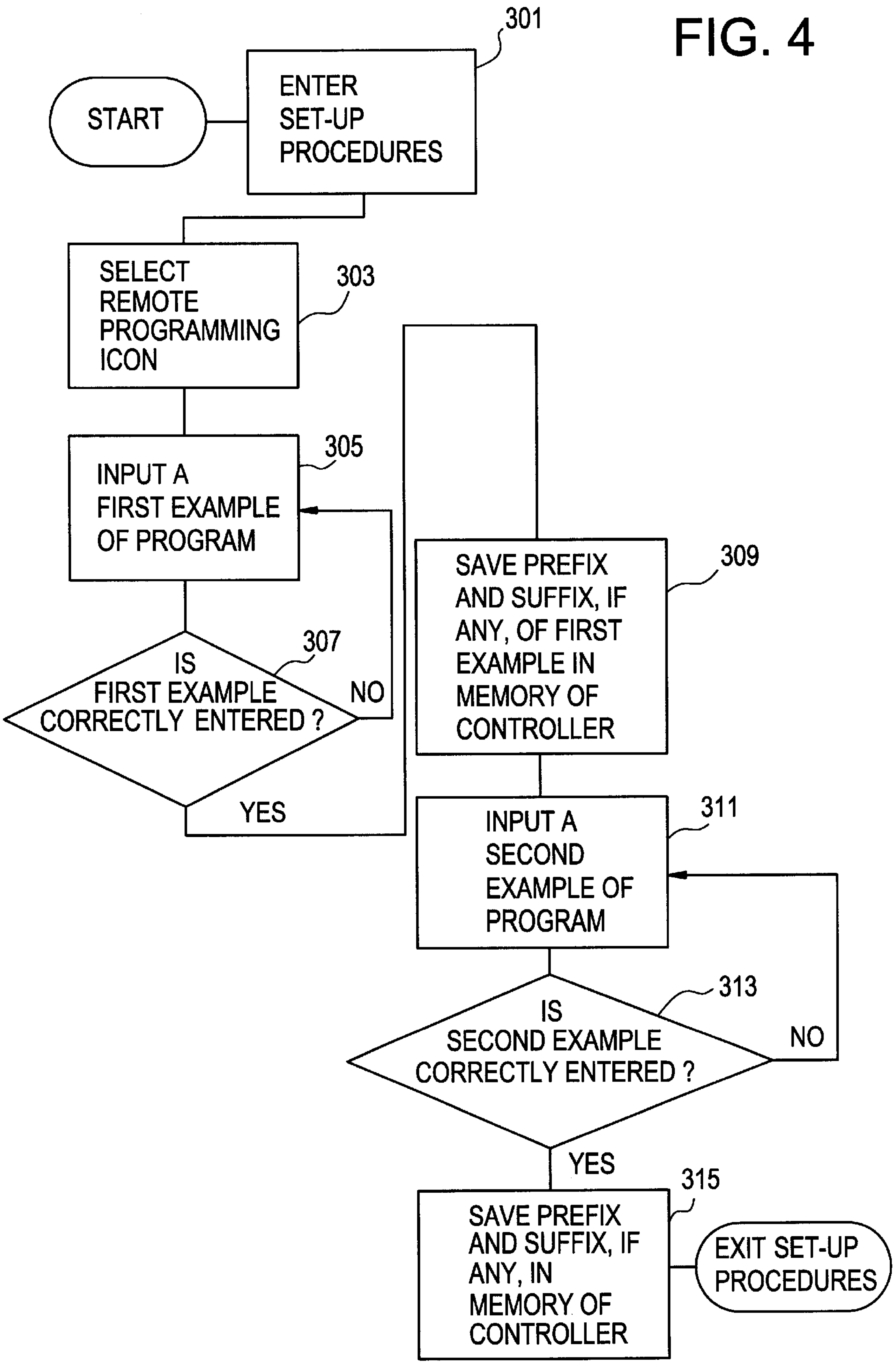
FIG. 4 is a flowchart of the "set-up" procedures for initializing the present invention in the preferred embodiment.

FIG. 4 is a flowchart of a set-up procedure for initializing the present invention in the preferred embodiment. The method described in FIG. 4 corresponds to the processing steps that are implemented in main processor 21 and remote control code processor 27 (shown in FIG. 2) in order to realize the present invention.

The process of the present invention requires a one-time set-up procedure which enables a user to program the controller to "learn" the format of a particular brand of remote A/V component based on examples entered by the user. These set-up procedures, however, must be repeated for each different type or brand of remote A/V component. Hence, a separate set-up procedure may be needed for programming the remote control unit to operate a television set, compact disc player, laser disc player, VCR, etc. Upon completing the set-up procedures, a user has a consistent input interface regardless of the device in use. As such, the user may input the most basic command to yield a particular function (e.g., entering only the numerals "4" and "7" in order to change the television tuning channel to "channel 47") regardless of the brand of remote device being used. Hence, the user does not have to remember what sequence of buttons are needed to switch between television channels because the controller has already "learned" the sequence of commands needed to implement the requested function in the remote A/V device.

The method of the present invention includes two distinct processes. The first process involves user set-up procedures for "teaching" the system. The second process involves operational procedures for operating the system.

The method of the present invention begins with the user initializing the set-up procedures for remote control unit 3 and controller 5 which may differ depending on the brand of controller and remote control unit being used. The learning-by-example set-up procedures may be a part of the system set-up procedures or may be separately implemented. In the preferred embodiment of the present invention, the set-up procedures are separate from the system set-up procedures for the controller and are discussed in detail below.

To begin, the user must enter the set-up procedures for the system, as illustrated in block 301 using the menu driven GUI remote. A new icon would be added to the existing menu of the remote control unit 3 in order to set-up the controller to implement the present invention. Upon selecting the icon to implement the present invention, as provided in block 303, the user is prompted to enter in a series of specific command sequence examples corresponding to the format of a specific product, as provided in block 303. Two examples of these command sequences are detailed in Tables 1 and 2 and are specifically directed to the function of directly tuning a channel for a television set. For this particular function, only two examples are necessary, however, more examples may be needed to program other remote A/V devices.

TABLE 1

To Directly Tune to "Channel 5"

| Possible Command Sequences | Prefix | Body | Suffix |
|---|---|---|---|
| 5 | None | 5 | None |
| 0, 5 | 0 | 5 | None |
| 0, 0, 5 | 00 | 5 | None |
| 5, Enter | None | 5 | Enter |
| 0, 5, Enter | 0 | 5 | Enter |
| Channel, 5 | Channel | 5 | None |

TABLE 2

To Directly Tune to "Channel 15"

| Possible Command Sequences | Prefix | Body | Suffix |
|---|---|---|---|
| 1, 5 | None | 1, 5 | None |
| 1, 5, Enter | None | 1, 5 | Enter |
| 0, 1, 5 | 0 | 1, 5 | None |
| >12, 1, 5 | >12 | 1, 5 | None |
| 5, +10 | None | 5, +10 | None |

During set-up, the user initially enters a first example of a command sequence, as shown in block 305 and illustrated in Table 1 under "Possible Command Sequences" to teach the controller what sequence of commands are necessary to program a channel number between 1 and 9 (in the example, channel 5). The command sequences provided in both Tables 1 and 2 correspond to different brands of remote devices. For example, a television manufactured by Sony Corporation requires a user to enter ">12,1,5" in order to tune to channel 15. This sequence of commands is entered into the remote control unit and transmitted to controller 5 where main processor 21 reads and separates the command sequences into a prefix, body and suffix, as illustrated in both tables.

The prefix is any numeral, character or function that must precede the actual channel number. In the above example, ">12" is the prefix. The body of the command sequence comprises the actual channel number desired such as channel 15, denoted as "1,5" in the above example. This command is ultimately the only command which will need to be entered by a user to achieve the desired function after the set-up procedures are complete. The suffix is any numeral, character or function which must follow the body in order to complete the desired function in the remote A/V device such as an "Enter" key. In the above example, no suffix is used.

When the user has completed entering the first command sequence, the user may press "Enter" to inform controller 5 that a complete command sequence has been entered. Alternatively, a timer may be provided in remote control unit 3 to monitor when a user has completed a desired command sequence.

Main processor 21 is able to recognize which part of the example is the prefix, body and suffix. For example, referring to Tables 1 and 2 above, the prefix is either a function command such as "Channel" (Table 1) or ">12" (Table 2), a zero, or nothing based on the manufacturer format used. This prefix is usually followed by the body which is a series of numeric or alphanumeric characters such as "5" (Table 1) or "1,5" (Table 2). The suffix always follows the body command and is similar to the prefix in that it is either a function command such as "Enter" or nothing.

Upon entering the first example, the user is then questioned as to whether the correct command sequence has been entered, shown in block 307. If not, the user is prompted to reenter the command sequence. If so, the prefix and suffix, if any, are stored in memory as illustrated in block 309.

The user then enters a second example in a manner similar to the first example as illustrated in Table 2 under "Possible Command Sequences" and shown in block 311. The second example is different than the first in that the user is teaching the controller the command sequence for channel numbers greater than nine (in our case channel 15). Once the second command sequence is entered, the controller may accurately interpret any range of numbers entered by a user to tune the television set to a desired channel.

The user is then questioned as to whether the correct command sequence has been entered, shown in block 313. If not, the user is prompted to reenter the command sequence. If so, the prefix and suffix are stored in memory as illustrated in block 315 and the user is prompted to exit the set-up procedures.

The above examples may be used for other remote A/V devices such as CD players, tape decks, and VCRs. When using other remote A/V devices, the sequence of commands may change with regard to the desired function (i.e., programming tracks on a CD or laserdisc player may require different sequence of commands than tuning a television set). For example, the command sequence for programming a CD player may require entering a prefix "Track," a body "1,2" and a suffix "Enter," to program track number "12" on a CD. Based on the foregoing examples, it is evident that the present invention may be used to teach controller 5 a wide variety of command sequences to operate many different types of remote A/V components.

Figure 5:
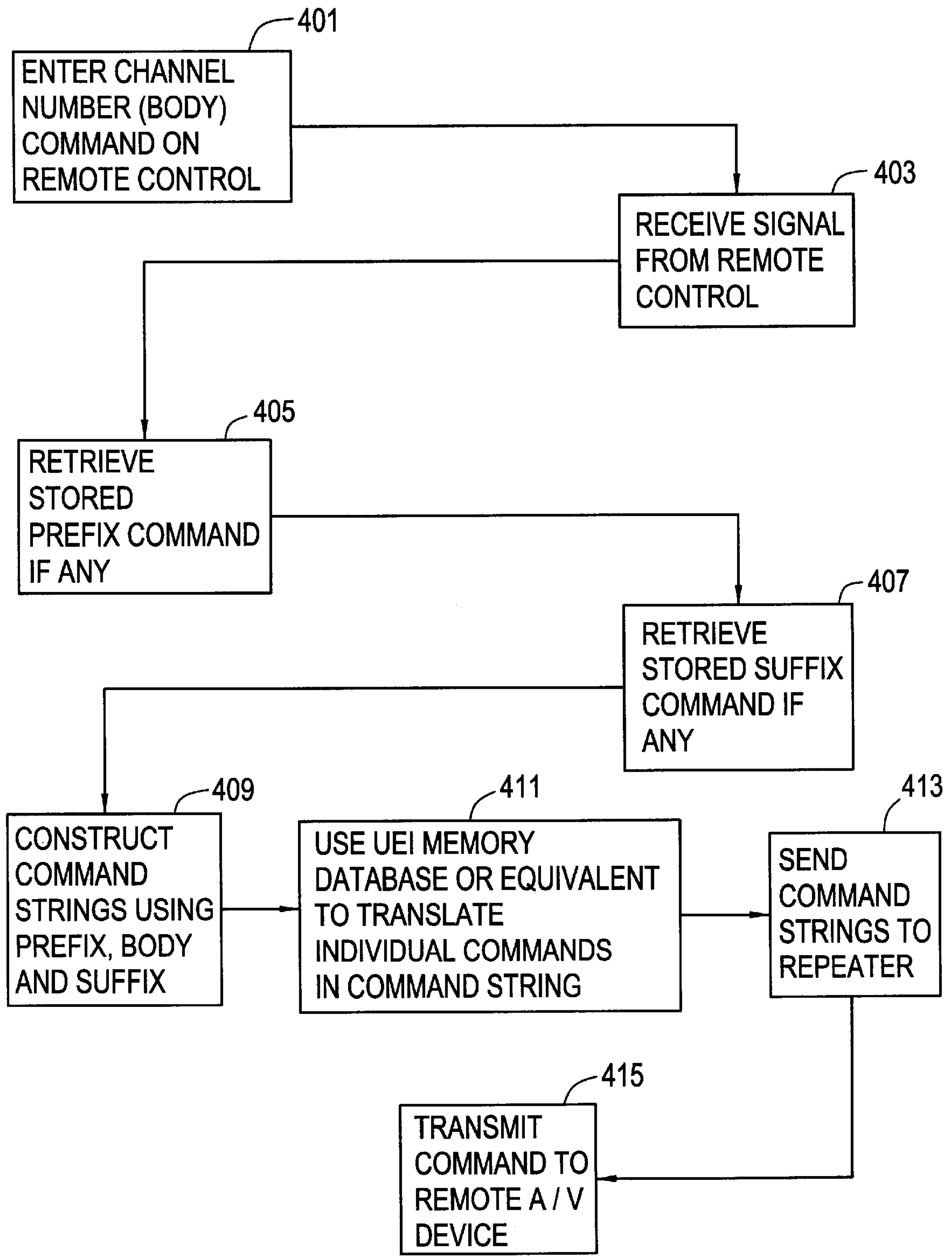
FIG. 5 is a flowchart of the "operation" procedures for implementing the present invention in the preferred embodiment.

FIG. 5 illustrates a flowchart of the "operation" procedures for implementing the present invention in the preferred embodiment. After the set-up procedures are complete, a user may now enter one command on remote control unit 3 to achieve the desired result. More specifically, to tune a television to channel 13, the user only needs to enter the channel number or "body" of the command, as shown in block 401, which in this case is "1,3. " The controller receives the command signal from the remote control unit, as shown in block 403. Depending on the command sequence programmed during the set-up procedures, main processor 21 identifies the command entered by the user as a body command and retrieves a corresponding prefix from memory, if any, in block 405. Main processor 21 then retrieves a corresponding suffix, if any, from memory as shown in block 407. Subsequently, main processor 21 appends the retrieved prefix and/or suffix, which corresponds with the command format previously stored in memory, to the entered command or "body," as shown in block 409, to construct a command string. For example, if a ">12" function is needed as a prefix and the "Enter" key is needed as a suffix in order for the remote device to implement the desired command, main processor 21 retrieves the required prefix and suffix to append to the entered command before sending the command string to remote control code processor 27 for translation. In essence, the command string is translated in remote control processor 27 by matching a manufacturer code with each command of the command string. The coded command string is subsequently sent to IR repeater 7, as provided in block 413, to transmit the coded command sequence to a remote A/V device, as shown in block 415. This method allows the user to control various components using only the minimum keystrokes necessary to achieve a desired result.

While the invention has been described with reference to the preferred embodiments, it should be appreciated by those skilled in the art that the invention may be practiced otherwise than as specifically described herein without departing from the spirit and scope of the invention. It is therefore, understood that the invention is limited only by the appended claims.

What is claimed is:

1. A method of programming a controller to learn a sequence of commands corresponding to a single specific function of a remote control unit, said method comprising the steps of:

inputting, via a keypad of said controller, at least two sets of commands, each for a desired single user function which corresponds to a specific remote device format, said commands having a prefix, a body and a suffix;

interpreting said sets of commands to create an appropriate code sequence to implement a particular remote device function by separating said commands into said prefix, said body and said suffix;

storing said prefix and said suffix in a memory device, retrieving said prefix and said suffix and appending said prefix and suffix to said body when a user subsequently inputs said body into said remote control unit to create a command string; and transmitting said command string from said controller to said remote device in order to control the functionality of said remote device based on said body entered by said user into said remote control unit.

2. The method of claim 1 wherein said inputting step is repeated for different remote device formats.

3. The method of claim 1 further comprising the step of translating said command string after said retrieving step by matching pre-programmed manufacturer codes with said command string before said transmitting step.

4. The method of claim 1 further comprising the steps of transmitting the appended prefix, body and suffix as a command signal to a selected remote audio and/or video device.

5. A programmable remote control system for controlling a remote device, comprising:

a remote control unit for receiving via a keypad, from a user of the remote control system, command information sufficient to identify a desired single function to be performed in the remote device;

a controller in communication with said remote control unit, said controller operating in a set-up mode to receive said command information from said remote control unit, to separate said command information into a prefix, body, and suffix, and to store said prefix and suffix in a memory, said controller further operating in an operational mode to receive said command information from said remote control unit, to retrieve said prefix and suffix from said memory in response to said command information, and to append said prefix and suffix to said command information to form a command string to be transmitted to the remote device; and a transmitter connected to said controller for transmitting said command string to said remote device.

6. The system of claim 5 wherein said remote control unit comprises a graphical user interface.

7. The system of claim 5 wherein said remote control unit transmits and receives radio frequency command signals from said controller.

8. The system of claim 7 wherein said radio frequency signals operate at 900 Mhz.

9. The system of claim 5 wherein said remote control unit transmits infrared signals to said controller.

10. The system of claim 5 wherein said controller comprises a remote control code processor having a pre-programmed database of manufacturer codes used to match remote control unit functions with said remote device.

11. The system of claim 10 wherein said remote control code processor houses a memory device for storing said commands entered by a user.

12. The system of claim 5 wherein said remote control unit comprises a remote control code processor having a pre-programmed database of manufacturer codes used to match remote control unit functions with said remote device.

13. The system of claim 5 wherein said remote device comprises a remote control code processor having a pre-programmed database of manufacturer codes used to match remote control unit functions with said remote device.

14. A programmable remote control system for controlling a remote device, comprising:

command entry means for receiving, from a user of the remote control system, command information sufficient to identify a desired single function to be performed in the remote device, said command information being obtained via a keypad;

control means in communication with said command entry means, said control means operating in a set-up mode to receive said command information from said command entry means, to separate said command information into a prefix, body, and suffix, and to store said prefix and suffix in a memory, said control means further operating in an operational mode to receive said command information from said command entry means, to retrieve said prefix and suffix from said memory in response to said command information, and to append said prefix and suffix to said command information to form a command string to be transmitted to the remote device; and transmitter means connected to said controller for transmitting said command string to said remote device.

15. The system of claim 14 wherein said remote control means comprises a remote control unit having a graphical user interface.

16. The system of claim 15 wherein said remote control unit comprises a numerical keypad.

17. The system of claim 14 wherein said remote control means transmits and receives radio frequency command signals from said controller means.

18. The system of claim 14 wherein said controller means controls the operation of audio and/or video components based on user input.

19. The system of claim 14 wherein said control means has a pre-programmed database of manufacturer codes used to match remote control unit functions with a remote device.

20. The system of claim 14 wherein said control means includes a memory device for storing said commands entered by a user.

* * * * *